United States Patent
Tanaka et al.

(10) Patent No.: US 12,509,368 B2
(45) Date of Patent: Dec. 30, 2025

(54) FLUID STERILIZING APPARATUS

(71) Applicant: Stanley Electric Co., Ltd., Tokyo (JP)

(72) Inventors: Hideaki Tanaka, Tokyo (JP); Hiroyuki Kato, Tokyo (JP); Kazuhisa Shinno, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 388 days.

(21) Appl. No.: 18/260,723

(22) PCT Filed: Dec. 14, 2021

(86) PCT No.: PCT/JP2021/045942
§ 371 (c)(1),
(2) Date: Jul. 7, 2023

(87) PCT Pub. No.: WO2022/158169
PCT Pub. Date: Jul. 28, 2022

(65) Prior Publication Data
US 2024/0059588 A1    Feb. 22, 2024

(30) Foreign Application Priority Data
Jan. 25, 2021    (JP) .................................. 2021-009432

(51) Int. Cl.
*C02F 1/32* (2023.01)

(52) U.S. Cl.
CPC ........ *C02F 1/32* (2013.01); *C02F 2201/3228* (2013.01)

(58) Field of Classification Search
CPC ........................... C02F 1/32; C02F 2201/3228
See application file for complete search history.

(56) References Cited

U.S. PATENT DOCUMENTS

| 6,773,584 B2 * | 8/2004 | Saccomanno ........ B01D 53/007 210/205 |
| 7,691,343 B2 | 4/2010 | Ueberall |

(Continued)

FOREIGN PATENT DOCUMENTS

| CN | 1653002 A | 8/2005 |
| CN | 109574130 A | 4/2019 |

(Continued)

OTHER PUBLICATIONS

Chinese Office Action for Chinese Patent Application No. 202180090699.3 dated Apr. 30, 2025.
(Continued)

*Primary Examiner* — Sean M Luck
(74) *Attorney, Agent, or Firm* — KENEALY VAIDYA LLP

(57) ABSTRACT

A fluid sterilizing apparatus includes: a cylindrical inner pipe which has cutouts penetrating in a radial direction and an outlet pipe projecting in the radial direction; an outer pipe which has, between itself and the inner pipe, an annular space in communication with the cutouts and which houses the inner pipe; an inflow pipe which allows a fluid to flow into the outer pipe; an outflow pipe which is provided coaxially with the inflow pipe and which is connected with the outlet pipe to allow the fluid having passed through the annular space to flow out; and a light source which irradiates the fluid passing through the interior of the inner pipe with ultraviolet light via an ultraviolet light transmitting window.

5 Claims, 8 Drawing Sheets

(56) References Cited

U.S. PATENT DOCUMENTS

| | | | |
|---|---|---|---|
| 2003/0086817 | A1 | 5/2003 | Horton, III |
| 2020/0140291 | A1 | 5/2020 | Babaie et al. |
| 2020/0171184 | A1 | 6/2020 | Tanaka et al. |
| 2020/0189936 | A1 | 6/2020 | Kato et al. |

FOREIGN PATENT DOCUMENTS

| | | | |
|---|---|---|---|
| JP | 2018-202205 A | 12/2018 | |
| JP | 2020-089462 A | 6/2020 | |
| JP | 2020-092856 A | 6/2020 | |
| JP | 2020-099378 A | 7/2020 | |
| JP | 2020-521556 A | 7/2020 | |
| WO | 2003/039606 A1 | 5/2003 | |

OTHER PUBLICATIONS

International Search Report for PCT/JP2021/045942 dated Mar. 8, 2022.

* cited by examiner

FLUID STERILIZING APPARATUS

This application is a U.S. National Stage Application under 35 U.S.C § 371 of International Patent Application No. PCT/JP2021/045942 filed Dec. 14, 2021, which claims the benefit of priority under 35 U.S.C. § 119 to Japanese Patent Application No. 2021-009432 filed Jan. 25, 2021, the disclosures of all of which are hereby incorporated by reference in their entireties.

TECHNICAL FIELD

The present invention relates to a fluid sterilizing apparatus that uses ultraviolet light to sterilize a fluid passing through a flow path.

BACKGROUND ART

In recent years, the sterilizing action of ultraviolet rays (wavelength: 240 to 380 nm) has been used in germicidal lamps for food storage, medical equipment, and the like. In addition, there are well-known devices that irradiate a fluid flowing through a flow path with ultraviolet light from an ultraviolet LED so as to sterilize the fluid to be used as washing water, and the like.

For example, the fluid sterilizing apparatus of Patent Literature 1 below mainly is composed of a substrate on which a light source is mounted, a housing (fluid sterilization section) having a straight pipe type flow path, a fluid inflow port, a fluid outflow port, and a reflector arranged to surround a cylindrical body. The cylindrical body is made of quartz, which is an ultraviolet light transmitting material, so that the ultraviolet light emitted from the light source is transmitted through the cylindrical body.

The fluid is exposed to the ultraviolet light which is emitted from the light source fitted in the opening of the reflector and then diffused by the reflector. This promotes the sterilization of the fluid (paragraphs 0038, 0039, 0050, and FIG. 2 in Patent Literature 1).

CITATION LIST

Patent Literature

Patent Literature 1: Japanese Patent Application Laid-Open No. 2020-92856

SUMMARY OF INVENTION

Technical Problem

The fluid sterilizing apparatus of Patent Literature 1 has a straight pipe type flow path, so that the flow velocity distribution is homogenized by lengthening the run-up section. However, there is a problem with such a fluid sterilizing apparatus that the reactor thereof has to be made longer than that of conventional ones to improve sterilization efficiency, and the size of the apparatus becomes larger.

The present invention has been made in view of such circumstances, and it is an object of the invention to provide a small fluid sterilizing apparatus capable of efficiently irradiating a fluid with ultraviolet light.

Solution to Problem

A fluid sterilizing apparatus in accordance with the present invention includes: a cylindrical inner pipe which has one end thereof in an axial direction open and has cutouts penetrating in a radial direction, and an outlet pipe projecting in the radial direction; an outer pipe which has, between itself and the inner pipe, an annular space in communication with the cutouts and which houses the inner pipe; an inflow pipe provided on the outer pipe to allow a fluid to flow in; an outflow pipe which is provided coaxially with the inflow pipe of the outer pipe and which is connected with the outlet pipe to allow the fluid having passed through the annular space to flow out; and a light source which irradiates the fluid passing through the interior of the inner pipe with ultraviolet light via an ultraviolet light transmitting window sealing an end portion of the outer pipe that is adjacent to the one end.

The fluid sterilizing apparatus is composed mainly of the inner pipe and the outer pipe. The inner pipe is cylindrical, and has one end thereof in the axial direction open, and includes the cutouts penetrating in the radial direction and the outlet pipe projecting in the radial direction. Further, the light source irradiates a fluid passing through the interior of the inner pipe with ultraviolet light via the ultraviolet light transmitting window, thereby sterilizing the fluid.

The outer pipe has the inflow pipe and the outflow pipe of a fluid, has the annular space, which is in communication with the cutouts, between itself and the inner pipe, and houses the inner pipe therein. The outflow pipe is connected to the outlet pipe of the inner pipe. A fluid flows in through the inflow pipe and passes through the annular space. Then, the fluid enters into the inner pipe through the cutouts to be sterilized and then flows out through the outflow pipe via the outlet pipe. With this arrangement, the fluid sterilizing apparatus in accordance with the present invention can be made smaller with a shorter length in the linear direction than conventional ones, thus making it possible to efficiently irradiate a fluid with ultraviolet light.

In the fluid sterilizing apparatus in accordance with the present invention, a reflection plate that reflects the ultraviolet light is preferably provided on a surface of the ultraviolet light transmitting window on the opposite side from the inner pipe.

Ultraviolet light is reflected by the reflection plate, so that the ultraviolet light travels not only to the inner pipe via the ultraviolet light transmitting window, but also to the annular space. This enables the apparatus to enhance the fluid sterilizing efficiency thereof.

Preferably, in the fluid sterilizing apparatus in accordance with the present invention, an illuminance sensor is provided on the back surface of the reflection plate, the reflection plate has an aperture, and the illuminance sensor detects the illuminance of the ultraviolet light through the aperture.

The fluid sterilizing apparatus in accordance with the present invention includes an illuminance sensor provided on the back surface of the reflection plate. Further, the reflection plate has an aperture, and the illuminance sensor can detect the illuminance of ultraviolet light through the aperture. Thus, the apparatus can check whether or not a fluid is being irradiated with ultraviolet light.

Further, in the fluid sterilizing apparatus in accordance with the present invention, the cutouts are preferably provided in pairs at symmetrical positions with respect to a central axis of the inner pipe.

The cutouts are provided in pairs at symmetrical positions with respect to the central axis of the inner pipe. This enables the apparatus to allow a fluid having flowed into the annular space to evenly flow into the interior of the inner pipe so as to homogenize the flow velocity distribution.

Further, in the fluid sterilizing apparatus in accordance with the present invention, the inner pipe is preferably made of a resin material.

Using a resin material (e.g., PTFE) for the inner pipe causes the inner pipe to diffuse and reflect ultraviolet light. This enables the apparatus to improve the irradiation efficiency of ultraviolet light, leading to still higher fluid sterilization efficiency.

DESCRIPTION OF EMBODIMENTS

The following will describe an embodiment of the fluid sterilizing apparatus according to the present invention with reference to the accompanying drawings.

Figure 1:
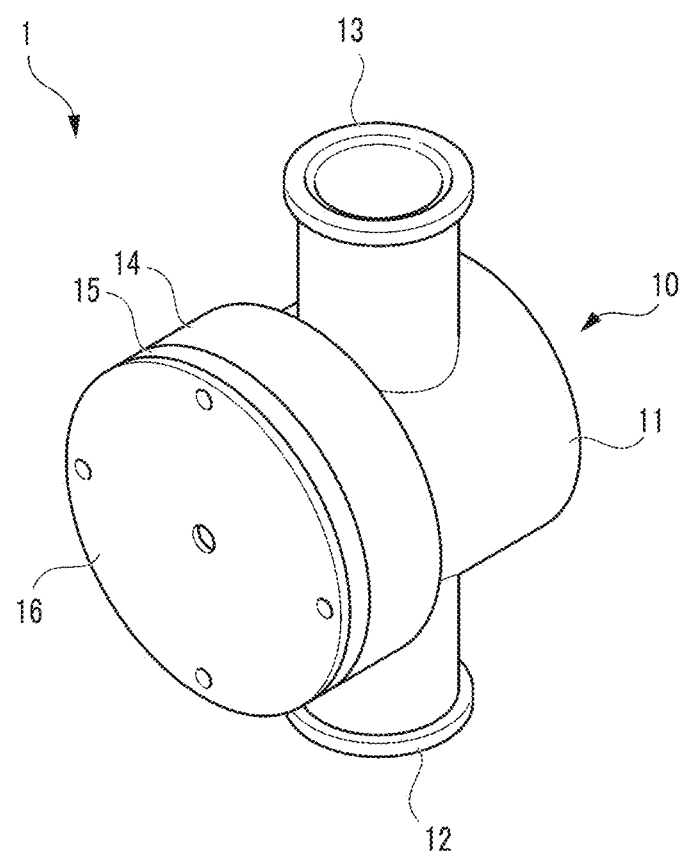
FIG. 1 is a perspective view of a fluid sterilizing apparatus of the present embodiment.
Figure 2:
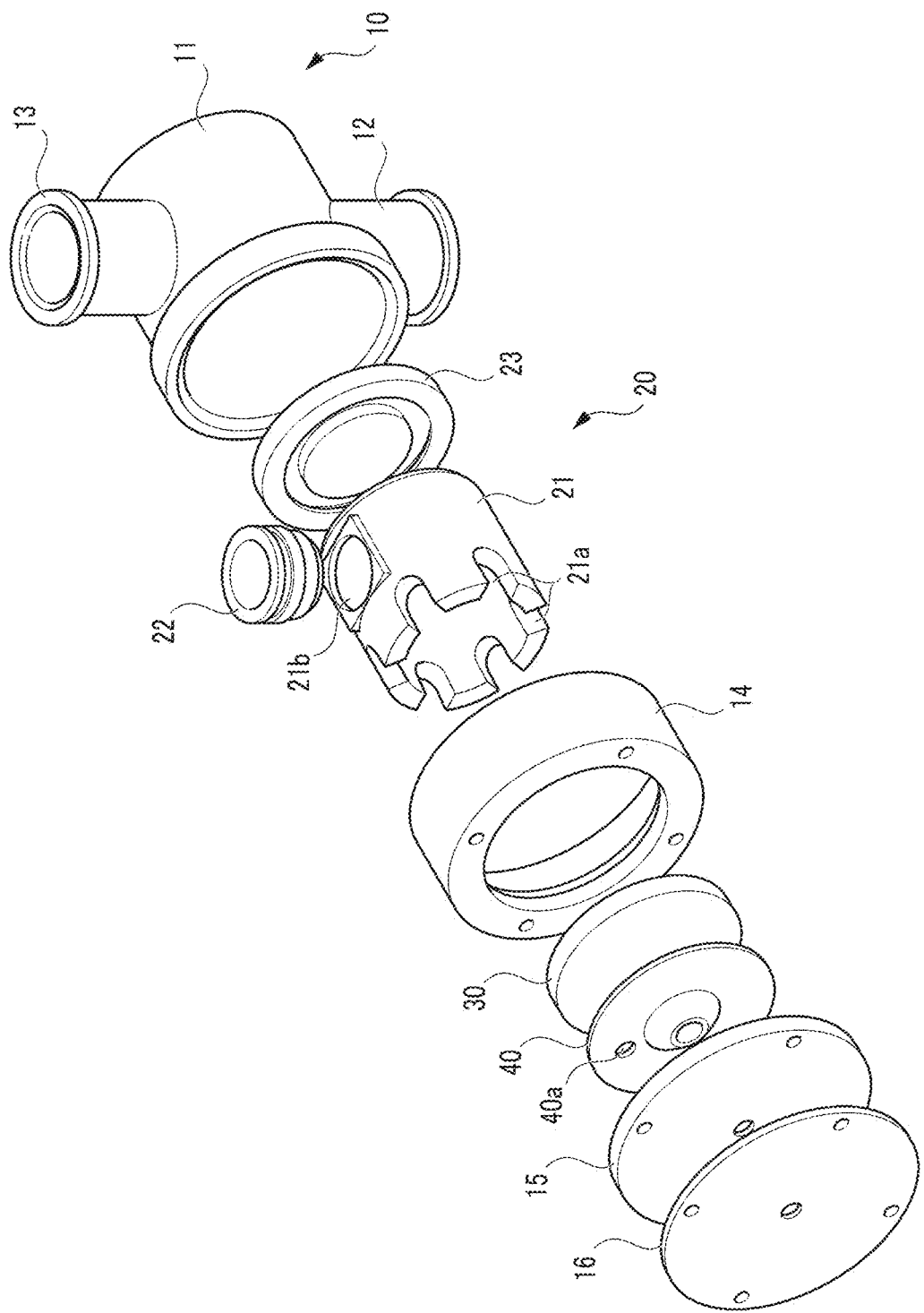
FIG. 2 is an exploded view of the fluid sterilizing apparatus of FIG. 1.

FIG. 1 is a perspective view of a fluid sterilizing apparatus 1 according to an embodiment of the present invention. Further, FIG. 2 is an exploded view illustrating the components of the fluid sterilizing apparatus 1 in a disassembled state. The fluid sterilizing apparatus 1 is an apparatus adapted to sterilize a fluid passing through a flow path by irradiating the fluid with ultraviolet light, and is used for water storage tanks of ice makers and the like, water pipes, water heaters, water servers, circulation equipment, drink servers, and the like.

As illustrated in FIG. 1, an outer pipe 10 of the fluid sterilizing apparatus 1 is composed of a main body 11, an inflow pipe 12, an outflow pipe 13, a retaining cap 14, a base plate 15, and a lid 16. The main body 11, the inflow pipe 12, and the outflow pipe 13 are made of stainless steel, but the material can be changed to other metal materials or resin materials according to the purpose. Further, the retaining cap 14, the base plate 15, and the lid 16 are made of aluminum in consideration of heat dissipation.

A fluid to be sterilized travels to the main body 11 through the inflow pipe 12, and flows out of the outer pipe 10 through the outflow pipe 13. The outflow pipe 13 is a straight pipe type provided coaxially with the inflow pipe 12. This provides an advantage of easier incorporation into various types of systems, as compared with a so-called L-shaped fluid sterilizing apparatus.

A light source is provided on a substrate (not illustrated) mounted on the base plate 15 to irradiate a fluid passing through the main body 11 with ultraviolet light. Thus, the fluid is sterilized, and the sterilized fluid eventually flows out through the outflow pipe 13.

As illustrated in FIG. 2, an inner pipe 20 is housed inside the main body 11 of the outer pipe 10. The inner pipe 20 is composed of a cylindrical part 21, an outlet pipe 22, and a cap 23. Each member constituting the inner pipe 20 is preferably made of a resin (e.g., PTFE), which diffuses and reflects ultraviolet light.

The cylindrical part 21 of the present embodiment has both ends in the axial direction open. Further, one end (the left end in the drawing) of the cylindrical part 21 is provided with six cutouts 21a penetrating in the radial direction. The outer diameter of the cylindrical part 21 is one size smaller than the inner diameter of the main body 11 of the outer pipe 10, thus forming a gap (annular space) between the cylindrical part 21 and the inner pipe 20. A fluid passes through the gap and flows into the cylindrical part 21 through the cutouts 21a. Further, the other end (the right end in the drawing) of the cylindrical part 21 is sealed by the cap 23 using an O-ring (not illustrated).

The cylindrical part 21 has an opening 21b penetrating in the radial direction, and the outlet pipe 22 is installed to the opening 21b. When the outlet pipe 22 is installed, the outlet pipe 22 projects in the radial direction of the cylindrical part 21. Further, the outlet pipe 22 is connected to the outflow pipe 13 in the interior of the outer pipe 10. Thus, a fluid that has flowed into the cylindrical part 21 passes via the outlet pipe 22 and flows out of the outer pipe 10 through the outflow pipe 13.

The number of the above-described cutouts 21a can be changed as appropriate, but the cutouts 21a are preferably provided in pairs at symmetrical positions with respect to the central axis of the inner pipe 20. This configuration makes it possible to allow a fluid that has flowed into the gap between the outer pipe 10 and the inner pipe 20 to evenly flow into the cylindrical part 21, thereby homogenizing flow velocity distribution.

An ultraviolet light transmitting window 30 and a reflection plate 40 are housed inside the retaining cap 14. Further, the base plate 15 and the lid 16 are fixed to the retaining cap 14 by being screwed thereto. The light source (not illustrated) is mounted on the substrate (not illustrated) on the base plate 15. The substrate is preferably made of copper or aluminum, which has excellent heat dissipation properties.

The light source (a light source 55 to be described later) is a UV-LED, and emits ultraviolet light, which has a wavelength that has a sterilizing effect or a wavelength that decomposes chemical substances. The wavelength of ultraviolet light is in the range of 240 to 380 nm.

The ultraviolet light transmitting window 30 is a circular plate of quartz, which transmits ultraviolet light, and makes surface contact with the end of the cylindrical part 21 on the side having the cutouts 21a so as to seal the end. More specifically, an O-ring (not illustrated) for sealing is attached around the ultraviolet light transmitting window 30, and the outer circumference of the O-ring is pressed onto the inner circumferential surface of the retaining cap 14. The diameter of the ultraviolet light transmitting window 30 is preferably equal to or greater than the outer circumference of the inner pipe 20 (the cylindrical part 21).

The reflection plate 40 is a circular plate made of PTFE, which reflects ultraviolet light, and is provided on the surface of the ultraviolet light transmitting window 30 on the side opposite from the inner pipe 20. The center of the reflection plate 40 has a recessed portion, and the center of the recessed portion has an aperture through which ultraviolet light is emitted. The ultraviolet light is reflected on the surface of the reflection plate 40 to irradiate a fluid having flowed into the cylindrical part 21.

In addition, the ultraviolet light transmitting window 30 can guide ultraviolet light to the gap (the annular space) by utilizing the reflection on the reflection plate 40 as well. Therefore, the sterilization progresses also for the fluid passing through the gap, thus making it possible to improve the sterilization efficiency.

As will be described in detail later, the reflection plate 40 has an aperture 40a for an illuminance sensor. The illuminance sensor detects the illuminance of ultraviolet light through the aperture 40a, thus making it possible to check whether a fluid is being irradiated with ultraviolet light.

Figure 3:
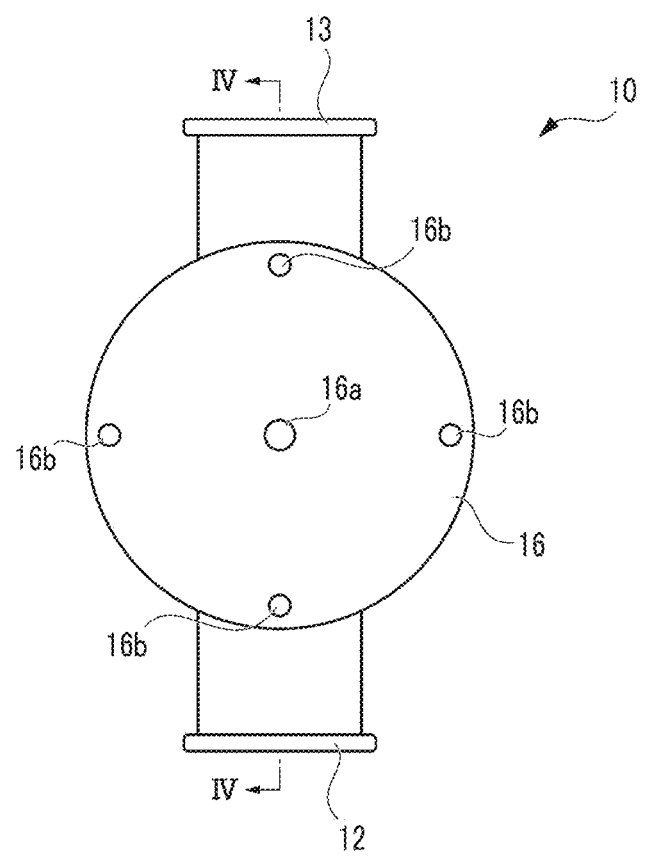
FIG. 3 is a plan view of the fluid sterilizing apparatus of FIG. 1 observed from the lid side.

FIG. 3 is a plan view of the fluid sterilizing apparatus 1 observed from the lid 16 side. The lid 16 is provided with an opening 16a at the center thereof, and openings 16b (four) in the peripheral area thereof. The opening 16a is an opening for pulling out the wires of the light source and the illuminance sensor. Further, the openings 16b are screw holes for fixing the substrate with the light source mounted thereon.

Figure 4:
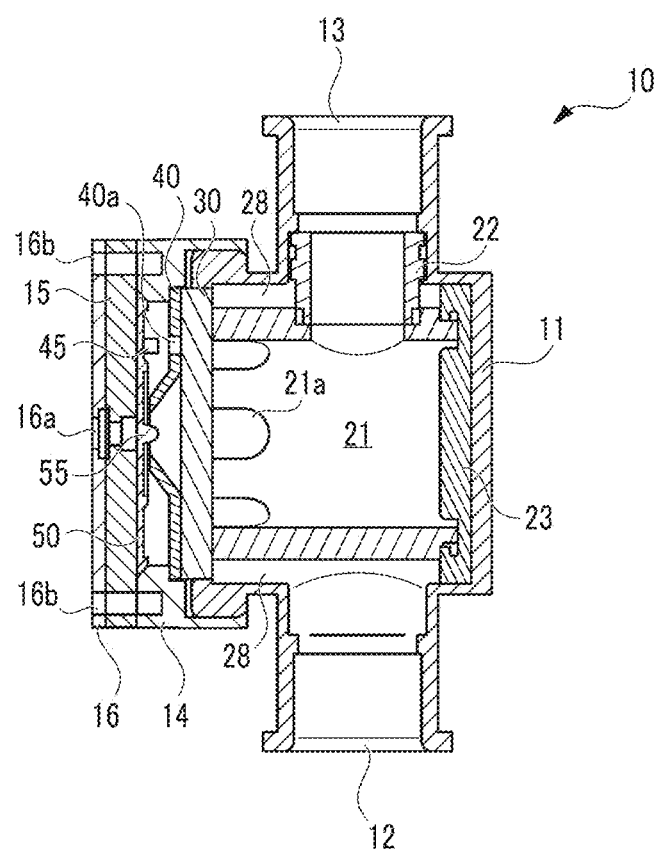
FIG. 4 is a sectional view of the fluid sterilizing apparatus of FIG. 3 taken along line IV-IV.

Next, FIG. 4 is a sectional view of the fluid sterilizing apparatus 1 of FIG. 3 taken along line IV-IV.

As illustrated, the inner pipe 20 is housed inside the outer pipe 10. More specifically, the cap 23 of the inner pipe 20 is in contact with the end (the right end in the drawing) of the main body 11 of the outer pipe 10, and an annular space 28 exists in the outer circumferential portion of the inner pipe 20. In addition, the outlet pipe 22 of the inner pipe 20 is fitted in the interior of the outflow pipe 13.

The cutouts 21a are formed in the end (adjacent to the ultraviolet light transmitting window 30) of the cylindrical part 21. Consequently, the fluid flowed in through the inflow pipe 12 always passes through the vicinity of the light source 55 so as to be reliably irradiated with ultraviolet light. Instead of providing the cutouts 21a, communication holes penetrating in the radial direction may be formed in the end of the cylindrical part 21 closer to the ultraviolet light transmitting window 30 than the axes of the inflow pipe 12 and the outflow pipe 13.

The ultraviolet light emitted from the light source 55 on a substrate 50 irradiates the cylindrical part 21 through the ultraviolet light transmitting window 30 and is partly reflected by the reflection plate 40. The ultraviolet light irradiates the inside of the cylindrical part 21 and the annular space 28, which are the sterilization treatment space, through the ultraviolet light transmitting window 30.

Further, an illuminance sensor 45 for ultraviolet light is mounted on the substrate 50. In addition, the illuminance sensor 45 is disposed on the back surface side of the aperture 40a of the reflection plate 40. Consequently, ultraviolet light enters through the aperture 40a, and is detected by the illuminance sensor 45.

The value of illuminance detected by the illuminance sensor 45 is used to check the intensity of the light source 55. For example, if the intensity of ultraviolet light becomes equal to or less than a predetermined threshold value, then a user can determine that the light source 55 needs to be replaced.

Figure 5:
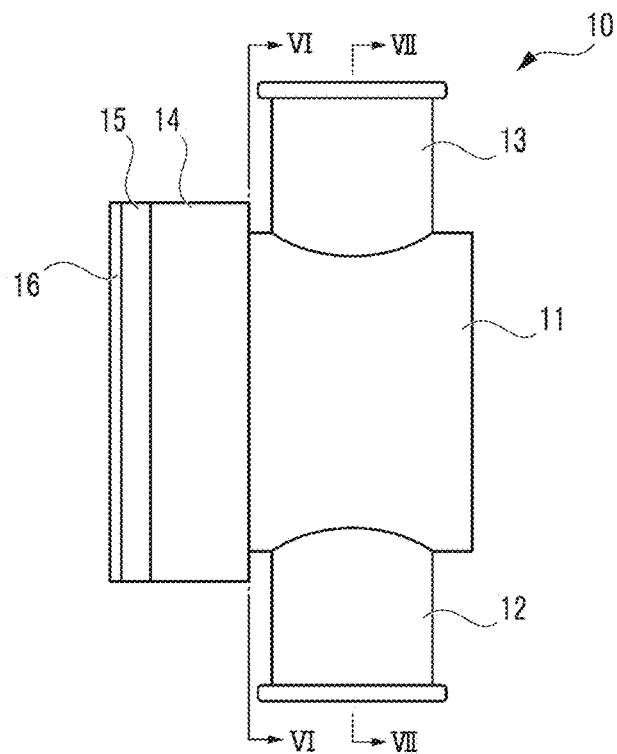
FIG. 5 is a plan view of the fluid sterilizing apparatus of FIG. 1 observed from the front side.

FIG. 5 is a plan view of the fluid sterilizing apparatus 1 observed from the front side. The following will describe the flow of a fluid in the fluid sterilizing apparatus 1. Further, FIG. 6 is a sectional view of the fluid sterilizing apparatus 1 of FIG. 5 taken along line VI-VI, and FIG. 7 is a sectional view of the fluid sterilizing apparatus 1 of FIG. 5 taken along line VII-VII.

Figure 6:
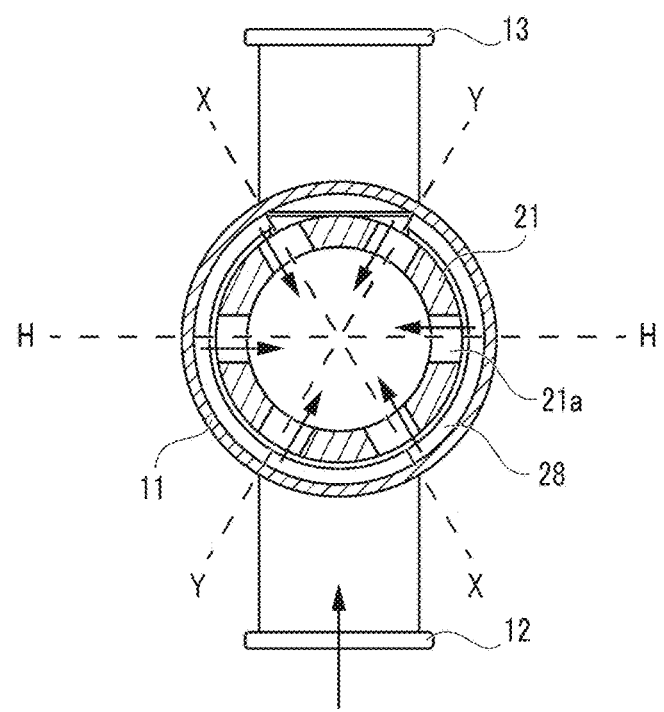
FIG. 6 is a sectional view of the fluid sterilizing apparatus of FIG. 3 taken along line VI-VI.

As illustrated in FIG. 6, the fluid flowing in through the inflow pipe 12 first reaches the annular space 28, and passes along the outer periphery of the inner pipe 20 (the cylindrical part 21). Then, the fluid enters into the cylindrical part 21 through the six cutouts 21a existing in the end portion of the cylindrical part 21.

Figure 7:
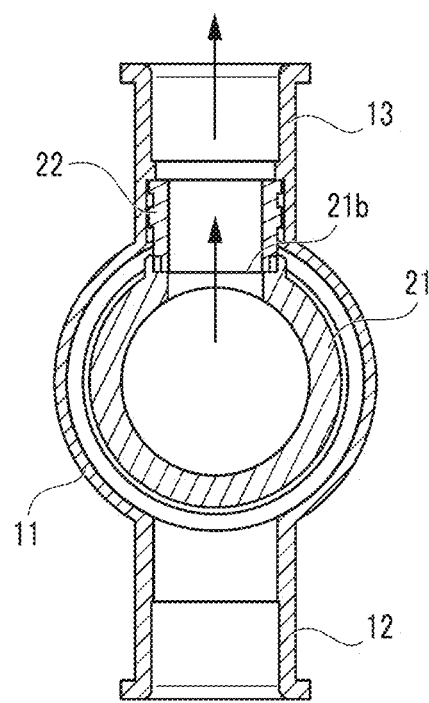
FIG. 7 is a sectional view of the fluid sterilizing apparatus of FIG. 3 taken along line VII-VII.

Thereafter, as illustrated in FIG. 7, the fluid travels toward the opening 21b of the cylindrical part 21 and flows out of the outflow pipe 13 via the outlet pipe 22. Although the fluid sterilizing apparatus 1 is a straight pipe type, the fluid travels while changing the direction thereof inside the outer pipe 10. This makes it possible to homogenize the flow velocity distribution. The ultraviolet light is irradiated during the period from when the fluid travels to the annular space 28 until the fluid reaches the outlet pipe 22, thus reliably sterilizing the fluid.

Figure 8A:
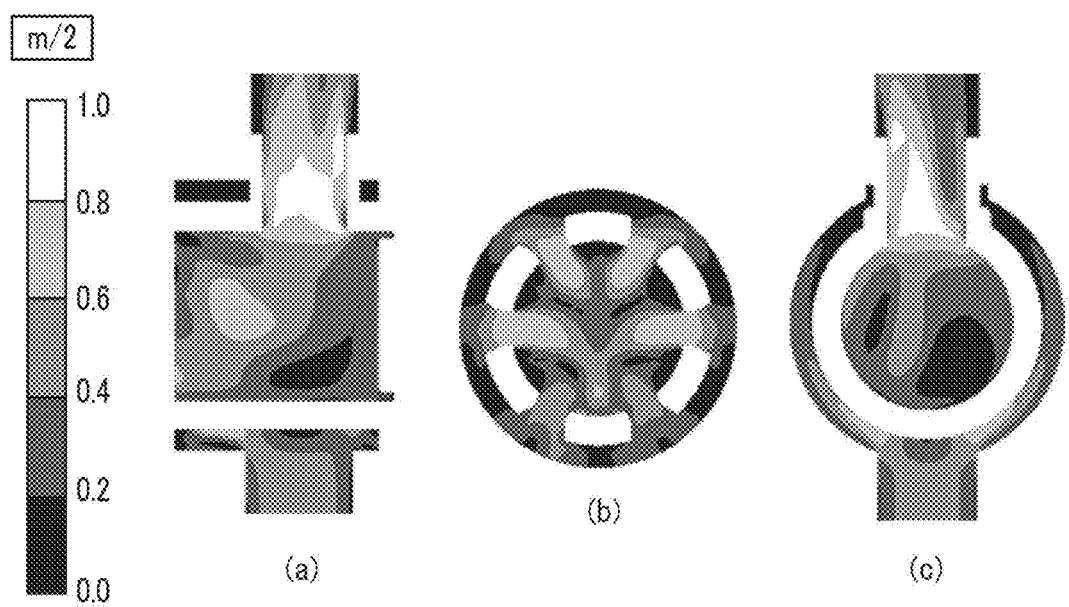
FIG. 8A (a) illustrates the flow velocity distribution in the sectional view of the fluid sterilizing apparatus of FIG. 3 taken along line IV-IV; (b) illustrates the flow velocity distribution in the sectional view of the fluid sterilizing apparatus of FIG. 5 taken along line VI-VI; and (c) illustrates the flow velocity distribution in the sectional view of the fluid sterilizing apparatus of FIG. 5 taken along line VII-VII.
Figure 8B:
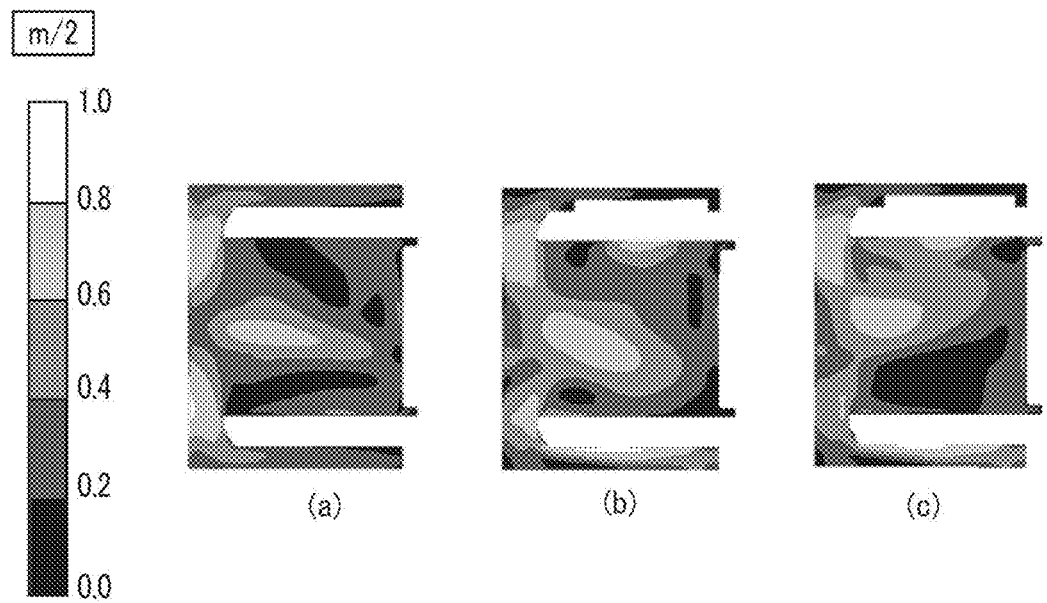
FIG. 8B (a) illustrates the flow velocity distribution in a horizontal section H of the fluid sterilizing apparatus of FIG. 6; (b) illustrates the flow velocity distribution in a slant section X of the fluid sterilizing apparatus of FIG. 6; and (c) illustrates the flow velocity distribution in a slant section Y of the fluid sterilizing apparatus of FIG. 6.

Referring now to FIG. 8A and FIG. 8B, the result of a flow velocity distribution simulation when the flow rate of a fluid is 7 [L/min] will be described.

FIG. 8A (a) illustrates the flow velocity distribution of the fluid sterilizing apparatus 1 of FIG. 3 in the sectional view taken along line IV-IV. Further, FIG. 8A (b) and FIG. 8A (c) illustrate the flow velocity distributions of the fluid sterilizing apparatus 1 of FIG. 5 in the sectional view taken along line VI-VI and the flow velocity distribution of the fluid sterilizing apparatus 1 of FIG. 5 in the sectional view taken along line VII-VII, respectively.

According to FIG. 8A (a) and FIG. 8A (b), the flow velocity of the fluid is low (0.2 to 0.4 [m/s]) in the area from the inflow pipe 12 to the annular space 28, and the flow velocity momentarily becomes high (0.6 to 0.8 [m/s]) in the area from the cutouts 21a to the entrance into the cylindrical part 21. Further, according to FIG. 8A (c), the flow velocity inside the cylindrical part 21 is relatively low (0.2 to 0.6 [m/s]), and the flow velocity becomes high again (0.6 to 1.0 [m/s]) when the fluid reaches the outflow pipe 13.

FIG. 8B (a) illustrates the flow velocity distribution in the horizontal section H of the fluid sterilizing apparatus 1 of FIG. 6. Further, FIG. 8B (b) and FIG. 8B (c) illustrate the flow velocity distributions in the slant sections X and Y, respectively, of the fluid sterilizing apparatus 1 of FIG. 6. FIG. 8B (a) to (c) also indicate that the flow velocity is high in the area from the cutouts 21a to the entrance into the cylindrical part 21, while the flow velocity is slow inside (especially in the vicinity of the center of) the cylindrical part 21.

Lastly, referring to FIG. 9A and FIG. 9B, the result of the ultraviolet light illuminance distribution simulation when the flow rate of a fluid is 7 [L/min] will be described.

Figure 9A:
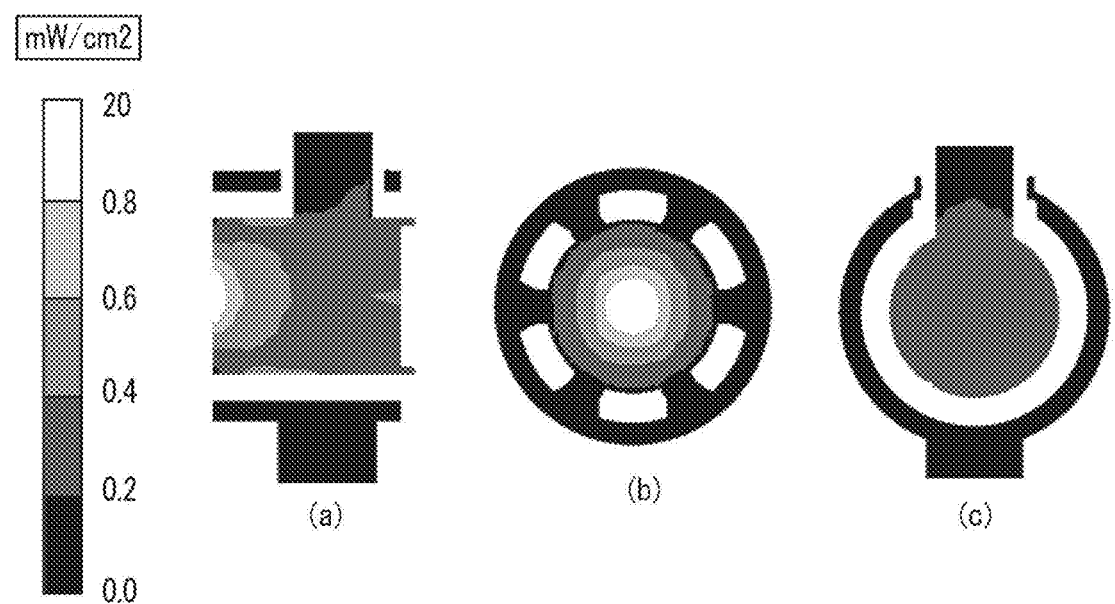
FIG. 9A (a) illustrates the illuminance distribution in the sectional view of the fluid sterilizing apparatus of FIG. 3 taken along line IV-IV; (b) illustrates the illuminance distribution in the sectional view of the fluid sterilizing apparatus of FIG. 5 taken along line VI-VI; and (c) illustrates the illuminance distribution in the sectional view of the fluid sterilizing apparatus of FIG. 5 taken along line VII-VII.

FIG. 9A (a) illustrates the illuminance distribution in the sectional view of the fluid sterilizing apparatus 1 of FIG. 3 taken along line IV-IV Further, FIG. 9A (b) and FIG. 9A (c) illustrate the illuminance distributions in the sectional view of the fluid sterilizing apparatus 1 of FIG. 5 taken along line VI-VI and the sectional view of the fluid sterilizing apparatus 1 of FIG. 5 taken along line VII-VII, respectively.

According to FIG. 9A (a) and (c), the illuminance in the vicinity of the end portion of the cylindrical part 21 that has the cutouts 21a is highest (0.8 to 20 [mW/cm$^2$]), and the illuminance decreases toward the outflow pipe 13 (0.6 to 0.8 [mW/cm$^2$]). Further, according to FIG. 9A (b), the illuminance at the center of the cylindrical part 21 is highest (0.8 to 20 [mW/cm$^2$], and the illuminance decreases toward the inner wall of the cylindrical part 21 (0.6 to 0.8 [mW/cm$^2$]).

Figure 9B:
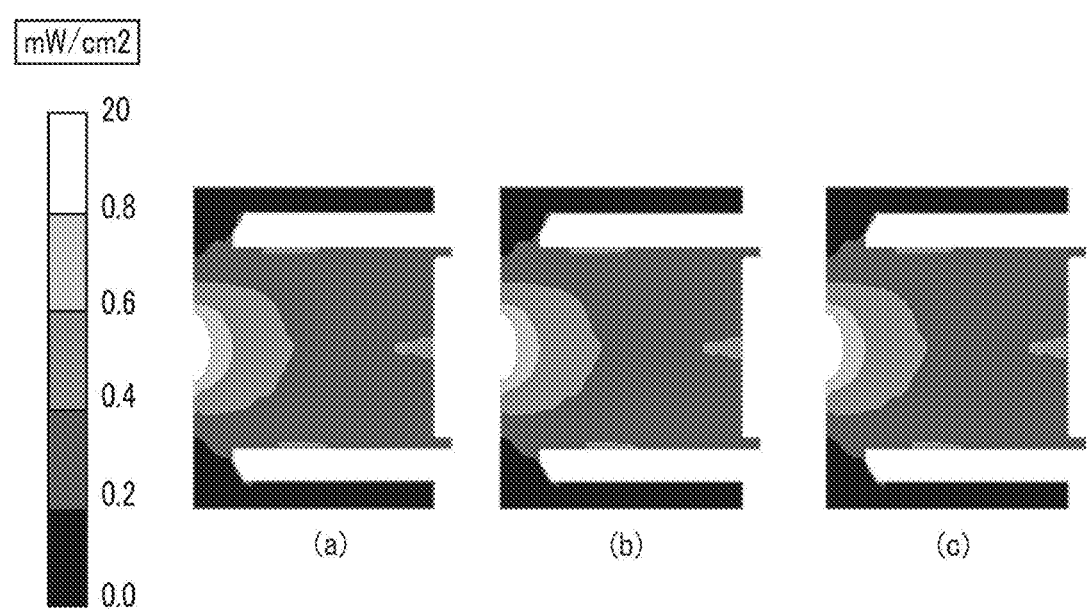
FIG. 9B (a) illustrates the illuminance distribution in the horizontal section H of the fluid sterilizing apparatus of FIG. 6; (b) illustrates the illuminance distribution in the slant section X of the fluid sterilizing apparatus of FIG. 6; and (c) illustrates the illuminance distribution in the slant section Y of the fluid sterilizing apparatus of FIG. 6.

FIG. 9B (a) illustrates the illuminance distribution in the horizontal section H of the fluid sterilizing apparatus 1 of FIG. 6. Further, FIG. 9B (B) and FIG. 9B (c) illustrate the illuminance distributions in the slant sections X and Y, respectively, of the fluid sterilizing apparatus 1 of FIG. 6.

FIG. 9B (a) to (c) also indicate that the illuminance in the vicinity of the end portion having the cutouts 21a is highest, and the illuminance decreases toward the outflow pipe 13. Further, it is seen that, although the annular space 28 has a relatively low illuminance (0.2 to 0.4 [mW/cm$^2$]), ultraviolet light is incident thereon.

As described above, the fluid sterilizing apparatus 1 of the present embodiment is a straight-pipe and small-sized apparatus, but is devised to reduce flow velocity in the interior thereof, thus homogenizing flow velocity distribution. Since the fluid passes through the vicinity of the light source 55, from which ultraviolet light is emitted, the fluid sterilization efficiency can be improved.

The above-described embodiment is merely an example, and can be changed as necessary according to applications. The size and shape of the cylindrical body of the fluid sterilizing apparatus 1 can be changed, because the flow rate varies according to applications. In addition, the fluid sterilizing apparatus 1 can be used, being horizontally installed such that the inflow pipe 12 and the outflow pipe 13 are oriented in the horizontal direction.

DESCRIPTION OF REFERENCE NUMERALS

1 . . . fluid sterilizing apparatus; 10 . . . outer pipe; 11 . . . main body; 12 . . . inflow pipe; 13 . . . outflow pipe; 14 . . . retaining cap; 15 . . . base plate; 16 . . . lid; 16a, 16b . . . opening; 20 . . . inner pipe; 21 . . . cylindrical part; 21a . . . cutout; 21b . . . opening; 22 . . . outlet pipe; 23 . . . cap; 28 . . . annular space; 30 . . . ultraviolet light transmitting window; 40 . . . reflection plate; 40a . . . aperture; 45 . . . illuminance sensor; 50 . . . substrate; and 55 . . . light source.

The invention claimed is:

1. A fluid sterilizing apparatus comprising:
   a cylindrical inner pipe, one end of which in an axial direction is open and which has cutouts penetrating in a radial direction and an outlet pipe projecting in the radial direction;
   an outer pipe which has, between itself and the inner pipe, an annular space in communication with the cutouts and which houses the inner pipe;
   an inflow pipe provided at the outer pipe to allow a fluid to flow in;
   an outflow pipe which is provided coaxially with the inflow pipe of the outer pipe and which is connected with the outlet pipe to allow the fluid having passed through the annular space to flow out; and
   a light source which irradiates the fluid passing through the interior of the inner pipe with ultraviolet light via an ultraviolet light transmitting window sealing an end portion of the outer pipe that is adjacent to the one end.

2. The fluid sterilizing apparatus according to claim 1, wherein a reflection plate which reflects the ultraviolet light is provided on a surface of the ultraviolet light transmitting window on an opposite side from the inner pipe.

3. The fluid sterilizing apparatus according to claim 2, including:
   an illuminance sensor provided on a back surface side of the reflection plate,
   wherein the reflection plate has an aperture, and the illuminance sensor detects an illuminance of the ultraviolet light through the aperture.

4. The fluid sterilizing apparatus according to claim 1, wherein the cutouts are provided in pairs at symmetrical positions with respect to a central axis of the inner pipe.

5. The fluid sterilizing apparatus according to claim 1, wherein the inner pipe is made of a resin material.

* * * * *